United States Patent [19]

Hirabayashi et al.

[11] Patent Number: 4,620,436
[45] Date of Patent: Nov. 4, 1986

[54] METHOD AND APPARATUS FOR CALIBRATING TRANSFORMATION MATRIX OF FORCE SENSOR

[75] Inventors: Hisaaki Hirabayashi, Yokohama; Koichi Sugimoto, Hiratsuka; Shinichi Arai, Yokohama; Tomoyuki Masui, Yokohama; Hidetoshi Inaba, Yokohama, all of Japan

[73] Assignee: Hitachi, Ltd., Tokyo, Japan

[21] Appl. No.: 784,502

[22] Filed: Oct. 4, 1985

[30] Foreign Application Priority Data

Oct. 9, 1984 [JP] Japan .................... 59-210435
Jun. 5, 1985 [JP] Japan .................... 60-120416

[51] Int. Cl.$^4$ .................................... G01L 25/00
[52] U.S. Cl. .................................... 73/1 B
[58] Field of Search ............... 73/1 B, 1 R, 862.04; 364/513; 901/33, 34, 35

[56] References Cited

U.S. PATENT DOCUMENTS

| | | | |
|---|---|---|---|
| 4,094,192 | 6/1978 | Watson et al. | 73/1 B |
| 4,132,318 | 1/1979 | Wang et al. | 73/862.04 |
| 4,503,507 | 3/1985 | Takeda et al. | 364/513 |
| 4,547,858 | 10/1985 | Horak | 364/513 |

Primary Examiner—Stewart J. Levy
Assistant Examiner—Robert R. Raevis
Attorney, Agent, or Firm—Beall Law Offices

[57] ABSTRACT

The present invention relates to a method and an apparatus for calibrating a transformation matrix of a force sensor, in which: a force sensor is attached between a wrist portion and a hand portion of a robot; a standard work (weight) whose weight and position of a center of gravity are known is attached or held to the hand portion; each driving source of the robot is made operative in response to commands from a control unit and thereby sequentially changing the posture of the force sensor attached to the robot; the control unit obtains a force consisting of a force and a moment due to an arithmetic operation from the posture and position information of the force sensor which is detected on the basis of signals from encoders to detect an operational amount of each operating element of the robot and from the weights and the positions of the centers of gravity of the standard work and the hand portion and the like inputted as data; the control unit receives a strain voltage detected from the force sensor; the control unit calculates the transformation matrix of the force sensor from the force consisting of the force and moment derived and from the strain voltage received in accordance with a predetermined arithmetic logic equation and then stores the transformation matrix into memory means; and then the transformation matrix of the force sensor is calibrated.

2 Claims, 11 Drawing Figures

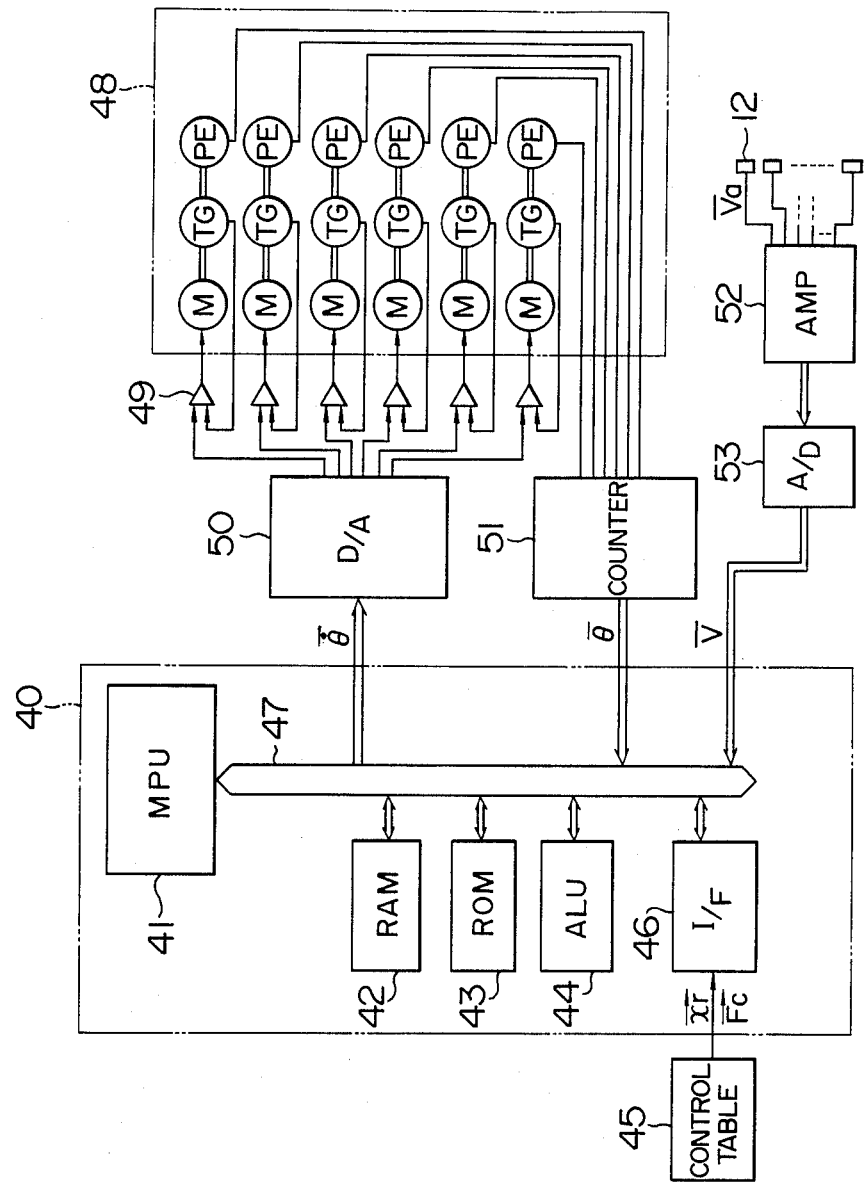

FIG. 10

$$\overbrace{\begin{bmatrix} f_x \\ f_y \\ f_z \\ m_x \\ m_y \\ m_z \end{bmatrix} = \begin{bmatrix} b_{11} & b_{12} & \cdots & b_{1n} \\ b_{21} & b_{22} & \cdots & b_{2n} \\ \vdots & \vdots & & \vdots \\ \vdots & \vdots & & \vdots \\ \vdots & \vdots & & \vdots \\ b_{61} & b_{62} & \cdots & b_{6n} \end{bmatrix} \begin{bmatrix} v_1 \\ v_2 \\ \vdots \\ \vdots \\ \vdots \\ v_n \end{bmatrix}}^{\overline{F} = [B]\overline{V}} \quad (n \geq 6)$$

FIG. 11

$$\overbrace{\begin{bmatrix} f_x \\ f_y \\ f_z \\ m_x \\ m_y \\ m_z \\ 1 \end{bmatrix} = \left[\begin{array}{cccc|c} b_{11} & b_{12} & \cdots & b_{1n} & b_{off1} \\ b_{21} & b_{22} & \cdots & b_{2n} & b_{off2} \\ \vdots & \vdots & & \vdots & \vdots \\ \vdots & \vdots & & \vdots & \vdots \\ \vdots & \vdots & & \vdots & \vdots \\ b_{61} & b_{62} & \cdots & b_{6n} & b_{off6} \\ \hline 0 & 0 & \cdots & 0 & 1 \end{array}\right] \begin{bmatrix} v_1 \\ v_2 \\ \vdots \\ \vdots \\ \vdots \\ v_n \\ 1 \end{bmatrix}}^{\overline{F}' = [A]\overline{V}'} \quad (n \geq 6)$$

METHOD AND APPARATUS FOR CALIBRATING TRANSFORMATION MATRIX OF FORCE SENSOR

BACKGROUND OF THE INVENTION

The present invention relates to detecting method and apparatus of a force sensor for automatically detecting a transformation matrix indicative of the relationship between the strain voltage and the force (force and torque are referred to as a "force" as a general term) in a six degree of freedom force sensor (namely, which can detect three components of the force and three components of the torque) which is attached to a robot.

A force sensor is attached to a robot and finds out the relation between the force and the strain voltage in the relevant portion. The relation between the strain voltage and the force is unconditionally determined and it is expressed by the following mathematical expression.

$$\bar{F} = [B]\bar{V} \qquad (1)$$

Where, $\bar{F}$ is a force which is applied to the sensor and $\bar{V}$ is a strain voltage. [B] is a constant showing the relation between $\bar{F}$ and $\bar{V}$ and is generally called a transformation matrix. $\bar{F}$ and $\bar{V}$ can be together expressed by vectors.

As a conventional example of methods for obtaining the transformation matrix [B], there has been proposed U.S. Pat. No. 4094192, "Method and Apparatus for Six Degree of Freedom Force Sensing".

A measuring apparatus in this conventional example is shown in FIG. 1. A force sensor 2 is fixedly attached to a base 1. A cable 4 is attached to a moving portion 3 of the force sensor 2 and a sash weight 5 depends from the end of the cable 4 through a pulley 6. The weight of the sash weight and the attaching direction of the cable 4 are changed by such an apparatus. Due to this, the data necessary for the transformation matrix is obtained and the transformation matrix is calculated.

Although this conventional example is an effective method of obtaining the transformation matrix, it has a problem such that a large amount of labor and a long time are needed. In addition, in the case where the force sensor is attached to a robot and the characteristic values of the force sensor are varied due to an impulse force or the like, the transformation matrix has to be calculated by removing the force sensor from the robot every time they are varied. In other words, when a robot attached to a force sensor is operated, if a hand portion of the robot collides with an object, characteristic values of the force sensor vary. The characteristic values also vary due to secular variations. Furthermore, when the force sensor is attached between the wrist portion and the hand portion, the degree of tightening of the screw used to attach the force sensor can vary the characteristic values.

SUMMARY OF THE INVENTION

It is an object of the present invention to provide a method and an apparatus for calibrating a transformation matrix of a force sensor in which the transformation matrix which is the characteristic value of the force sensor attached to a robot itself can be calibrated.

The present invention is made by paying attention to the points such that the state whereby a robot is set into different postures by attaching a force sensor and standard works to the robot is equivalent to the state whereby many independent forces (forces and moments) are applied to the force sensor and that the postures and their coordinates can be simultaneously detected from the robot itself. Namely, an attention is paid to the point such that the transformation matrix can be automatically calibrated on the basis of the postures and coordinates which are detected from the robot itself by merely setting the robot into a few kinds of different postures by swinging the wrist on the basis of certain conditions in the state whereby the force sensor and the proper standard work are attached to the robot.

On one hand, in the present invention, it is necessary to attach different standard works (weights) to a force sensor in case of calibrating the transformation matrix [B] with regard to the force sensor which can respond to four or more dimensions.

In addition, with respect to the force sensor which can respond to n dimensions, the present invention has a feature such that $(n+1)$ or more linear independent forces are applied and the transformation matrix [A] including a bias value is calibrated.

BRIEF DESCRIPTION OF THE DRAWINGS

FIG. 9 is a diagram showing a control unit and the like of a robot according to the present invention;
FIG. 10 is a diagram showing a relational expression between the voltage value $\bar{V}$ and force $\bar{F}$ which are detected in the force sensor having a six-dimensional vector;
and
FIG. 11 is a diagram showing an expression showing the principle to calculate the rigidity transformation matrix [B] of the force sensor according to the present invention.

DESCRIPTION OF THE PREFERRED EMBODIMENT

Figure 1:
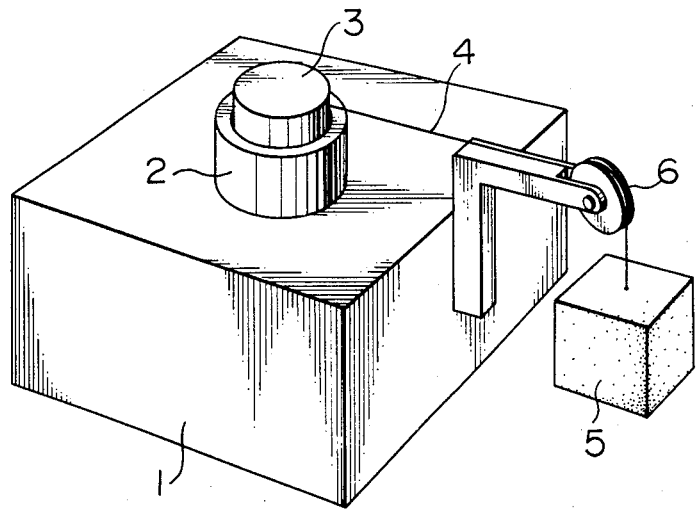
FIG. 1 is a diagram showing a conventional example.

The present invention will now be described hereinbelow with respect to an embodiment shown in the drawings.

Figure 2:
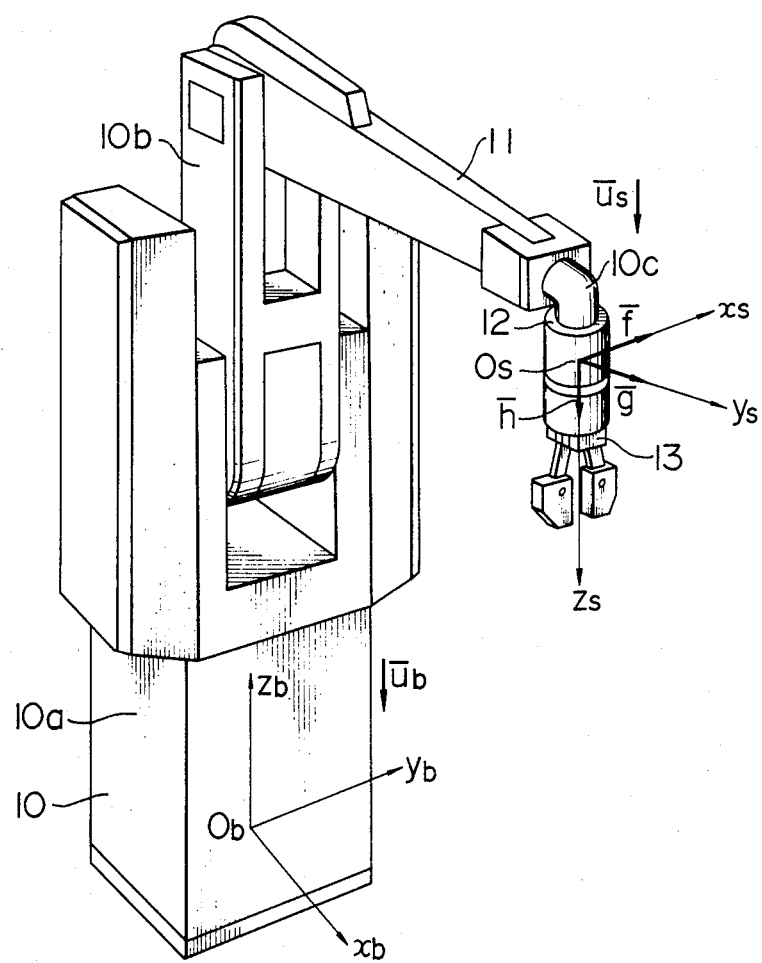
FIG. 2 is a diagram showing one embodiment of the present invention.

FIG. 2 is a diagram showing a robot to which a force sensor according to the present invention is attached. As a robot 10 having six degrees of freedom, for example, there have been proposed U.S. patent application Ser. No. 437308, EPC application No. 82110022.9, and the like. The robot 10 is equipped with a swivel pedestal 10a, an upper arm 10b and a forearm 11. A wrist 10c having three degrees of freedom is mounted at the end of the forearm 11. A force sensor 12 is attached between the wrist 10c and a hand portion 13.

The force sensor 12 is a strain gauge and generates strain voltages corresponding to the forces regarding six degrees of freedom in response to the force applied to the hand portion 13. The term "force" denotes both of the force and the moment and this force is a six-dimensional vector. The coordinate axes ($O_b-x_b-y_b-z_b$) of the base and the coordinate axes ($O_s-x_s-y_s-z_s$) of the force sensor 12 are different as shown in FIG. 2.

Figure 3:
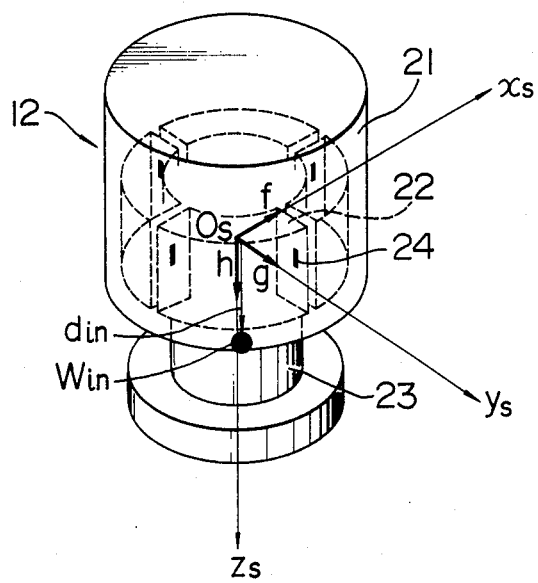
FIG. 3 is a diagram showing an arrangement example of a force sensor.

An arrangement of the force sensor 12 is shown in FIG. 3. The force sensor 12 comprises an external member 21, an internal member 23, and thin plate members 22. The external member 21 is fixed to the wrist 10c and the internal member 23 is fixed to the hand portion 13. The thin plate members 22 couple the internal member 23 with the external member 21. Strain gauges 24 are attached to portions of the thin plate members 22.

When a force is applied to the hand portion 13 in such an arrangement, the force is propagated to the internal member 23 coupled to the hand portion 13, causing the strain gauges 24 to be deformed through the coupling plates 22. The voltages corresponding to those deformations are generated at output terminals of the strain gauges 24 and are detected. The relationship between the force and the strain voltage is unconditionally determined by properly setting the number, dimensions, and attaching positions of the thin plate portions, and the number and attaching positions of the strain gauges, and the like. The relationship between the force sensor and the strain is unconditionally determined by designing the construction of the force sensor so as to satisfy the fact that, when plural independent forces are applied to the sensor, strain voltages corresponding to the forces are separately obtained. Therefore, the force can be detected from the magnitude of the strain voltage. The relation between the force and the strain voltage is decided by the rigidity transformation matrix [B]. However, there is a large possibility that the rigidity transformation matrix [B] is varied due to a time-dependent change or the impulse force applied to the hand portion after the force sensor 12 was attached to the robot. For example, when the robot to which a force sensor is attached is operated, if the hand portion collides with an object, the characteristic values of the force sensor (i.e. transformation matrix) vary due to the shock of the collision. The transformation matrix also varies due to secular variation (aging effects) or temperature variation. Therefore, it is necessary to calibrate the rigidity transformation matrix [B] in the state whereby the force sensor was attached to the robot.

On one hand, as shown in FIG. 9, a control unit 40 is connected to the robot 10 in order to allow the robot to perform a predetermined operation in response to a force signal detected from the force sensor 12 and further in accordance with a program stored in the control unit 40.

Practically speaking, as disclosed in U.S. patent application Ser. No. 621717 and EPC application No. 84107013.9, this robot is the joint type robot 10 comprising: the swivel pedestal 10a which rotates around the vertical axis on the base; the upper arm 10b which rotates around the horizontal axis on the swivel pedestal 10a; the forearm 11 rotatably coupled with the end of the upper arm 10b; and the wrist 10c rotatably mounted at the end of the forearm 11 so as to have three degrees of freedom as illustrated in the diagram. The force sensor 12 is attached to the end of the wrist 10c of the joint type robot 10. The force applied to the robot is detected by the force sensor 12. The present position of the robot is detected by way of output signals from encoders PE or the like coupled with motors M or the like for driving the respective operating elements 10a, 10b, 11 and 10c of the robot 10. In addition, tachogenerators TG or the like are coupled with the motors M such that the rotating speeds of the respective operating elements can be detected. Further, a proximity sensor or the like to detect the distance between the wrist 10c of the robot and an object may be attached to the wrist 10c.

In this manner, the position $\bar{\theta}$ of the robot, the voltage $\bar{V}$ detected from the force sensor 12, and the like are supplied to the control unit 40 constituted by a microcomputer. Further, the instruction values such as the position coordinate of the force sensor relative to the base, $\bar{x}_r$, postures coordinates $\bar{f}$, $\bar{g}$, $\bar{h}$, of the force sensor, force $\bar{F}_c$, weight of the weight, position of the center of gravity of the weight, weight of the hand portion, position of the center of gravity of the hand portion, internal weight of the force sensor, position of the center of gravity of the force sensor, instructions of predetermined points to form the operating path, and the like are inputted to the control unit 40 from a control table 45 or the like. $\bar{F}_c$ represents a force obtained by multiplying a voltage detected from the force sensor by a transformation matrix, and is applied to the force sensor. Practically speaking, the control unit 40 is constituted by, for example: a microprocessor 41; a RAM 42; a ROM 43; an arithmetic logic unit 44; an interface circuit (I/F) 46 to connect the control unit 40 with the control table 45; a D/A converter 50; a counter 51 to count the outputs from the encoders PE; an A/D converter 53 to convert an analog signal outputted from an amplifier 52 to a digital signal; and a bus line 47 to connect the above-mentioned components.

Although the instruction values of the position $\bar{x}_r$, force $\bar{F}_c$ and the like may be "0", in this case, the robot operates only by the force $\bar{F}$ which is applied to the hand portion 13. Namely, the passive mechanism is constituted. On the other hand, when no force is applied to the hand portion 13 (or the sensor 12 or the like is not attached to the hand portion 13) and only the instruction values of the position $\bar{x}_r$, force $\bar{F}_c$, and the like are given, the movement is determined by these instruction values.

In any of those cases, the control unit 40 generates an instruction value of the joint angular velocity $\dot{\theta}$ of the robot to servo amplifiers 49, thereby making the robot 10 operative.

For the coordinate conversion by the control unit 40, the signals from the encoders PE of the respective joints of the robot are counted by the counter 51 and the present position $\bar{\theta}$ is received and the coordinate conversion from the joint angle $\bar{\theta}$ into the orthogonal coordinates $\bar{x}$ of the hand system is performed. Actually, this coordinate conversion is performed by the arithmetic logic unit 44 in response to a command from the microprocessor 41. In addition, the external force $\bar{F}$ applied to the robot is detected by the force sensor 12. The control unit 40 receives the external force $\bar{F}$ through the A/D converter 53 as a voltage $\bar{V}$ of the strain gauge constituting the force sensor 12. The force calculating section 41, 43, 44 receives $\bar{V}$ and $\bar{x}$ ($\bar{\theta}$) and first converts the voltage $\bar{V}$ of the strain gauge into the force by way of the transformation matrix [B] or the like of the strain/force. In the actual process, this voltage to force conversion is performed by the ALU 44 in response to a command from the microprocessor 41. Next, in the case where the weight of an object which is grasped by the hand portion 13 and the hand is large, the values which are applied to the force sensor 12 differ in dependence on the posture of the hand. Therefore, the rigidity transformation matrix [B] is calibrated on the basis of the posture and position $\bar{\theta}$ of the hand portion 13, thereby eliminating the influence due to the posture of the hand and calculating the force $\bar{F}$ actually applied to the robot.

The value calculated in this manner is $\bar{F}$ and given to the main control section 41, 43, 44. The velocity $\bar{v}$ at which the hand portion 13 operates is calculated by the main control section. Next, since $\bar{v}$ is the value in the coordinate system fixed to the hand, this value is converted to the velocity $\bar{v}_0$ in the coordinate system of the base by way of the coordinate conversion.

Thereafter, the angular velocity $\bar{\theta}$ of each axis of the robot is calculated by the joint angle calculating section on the basis of the velocity $\bar{v}_0$ in the orthogonal coordinate system. In this case, $\bar{\theta}=J^{-1}\bar{v}_0$ (where, $J^{-1}$ is called an anti-Jacobian matrix and its elements are the function of each joint angle $\bar{\theta}$ of the robot). The servo amplifiers 49 operate on the basis of the angular velocity $\theta$, so that the motors M for the respective joints of the robot are made operative.

As well as the force $\bar{F}$ from the robot and the position $\bar{x}$ of the robot, the instruction values $\bar{F}_c$ and $\bar{x}_r$ of the force and position are also inputted to the main control section, and the velocity $\bar{v}$ of the hand portion is outputted.

The force $\bar{F}$ applied to the force sensor 12 has to be calculated from the voltage value $\bar{V}$ detected from the force sensor 12. It is necessary to preliminarily calibrate and determine the rigidity transformation matrix [B] for calculation of the force $\bar{F}$. A method of calibrating the transformation matrix [B] of the force sensor, which is a feature of the present invention, in the state whereby the force sensor was attached to the robot in this manner will then be practically described hereinbelow.

[1]
(1) Precondition to obtain the transformation matrix [B].

Strictly speaking, the strain voltage $\bar{V}$ of the force sensor 12 can be specified by $$\bar{V}=\bar{V}_0=\bar{V}_d \qquad (2)$$

Where, $\bar{V}_d$ is a voltage generated when no force is applied to the force sensor 12 (the internal weight is also regarded as a force). This voltage $V_d$ is an n-dimensional vector. $\bar{V}_0$ is a voltage generated when a force was actually applied to the force sensor 12 (internal weight is regarded as a force). This voltage $\bar{V}_0$ is also an n-dimensional vector. In this case, $n \geq 6$.

The force $\bar{F}$ is a force applied to the force sensor 12 and is considered in the sensor coordinate system. This force $\bar{F}$ consists of a force and a moment and is a six-dimensional vector.

Further, it is assumed that there is the linear relation between the force $\bar{F}$ and the strain voltage $\bar{V}$. Thus, $$\bar{F}=[B]\bar{V} \qquad (3)$$

is satisfied, wherein [B] is a matrix of six rows and n columns.

(2) Procedure to obtain the voltage $\bar{V}_d$:

The internal weight $W_{in}$ and the position $\bar{d}_{in}$ of center of gravity of the internal weight (this position is a value expressed by the sensor coordinate system (hereinafter, referred to as an S system) indicated by $O_x-\bar{s}_s-y_s-z_s$ shown in FIG. 2) can be preliminarily obtained using the design drawing or the like; therefore, they may be considered as known values which can be inputted from the control table 45.

Although it is necessary to obtain the strain gauge voltage $\bar{V}_d$ when the internal weight $W_{in}$ was removed, it cannot be removed because the internal weight $W_{in}$ is a part of the sensor. Therefore, the following method is adopted.

The force sensor 12 is attached to the end of the forearm 11 of the robot. Further, nothing is attached to the end of the force sensor 12.

The robot 10 is controlled by inputting the positions $\bar{x}, \bar{y}, \bar{z}$ and positions $\bar{f}, \bar{g}, \bar{h}$, and the like from the control table 45 shown in FIG. 9 in a manner such that the coordinate axis $z_s$ of the sensor coordinate system faces downward, namely, in the direction of the gravity. The strain voltage is measured by the force sensor 12 under the condition whereby the coordinate axis $z_s$ faces in the direction of the gravity. This strain voltage is set to $\bar{V}_{dow}$.

Next, the coordinate axis $z_s$ of the sensor coordinate system is set into the upward posture and the strain voltage is measured by the force sensor 12 in this posture. This strain voltage is set to $\bar{V}_{up}$.

From $\bar{V}_{dow}$ and $\bar{V}_{up}$, the voltage $\bar{V}_d$ is derived from the following equation.

$$\bar{V}_d=(\bar{V}_{dow}+\bar{V}_{up})/2 \qquad (4)$$

The foregoing terms "downward" and "upward" are based on the concept such that the posture is reversed with regard to the direction of the gravity. Due to this, the force and moment which are caused due to the internal weight applied to the force sensor are set off and become zero since their positive and negative signs are inverted. It is now assumed that the unit vector in the direction of the gravity in case of the downward posture is $\bar{u}_{dow}$ (S system indication) and the unit vector in the direction of the gravity in case of the upward posture is $\bar{u}_{up}$ (S system indication). Those unit vectors are considered in the sensor coordinate system. In this case, $$\bar{u}_{dow}=-\bar{u}_{up} \qquad (5)$$

The force $\bar{f}$ and moment $\bar{m}$ become as follows.

$$\begin{aligned} \bar{f} &= W_{in} \cdot \bar{u}_{up} + W_{in} \cdot \bar{u}_{dow} \\ &= 0 \end{aligned} \qquad (6)$$

$$\begin{aligned} \bar{m} &= \bar{d}_{in} \times W_{in} \cdot \bar{u}_{dow} + \bar{d}_{in} \times W_{in} \cdot \bar{u}_{up} \\ &= 0 \end{aligned} \qquad (7)$$

Therefore, equation (4) is correct and the voltage $\bar{V}_d$ is derived from equation (4).

Figure 4:
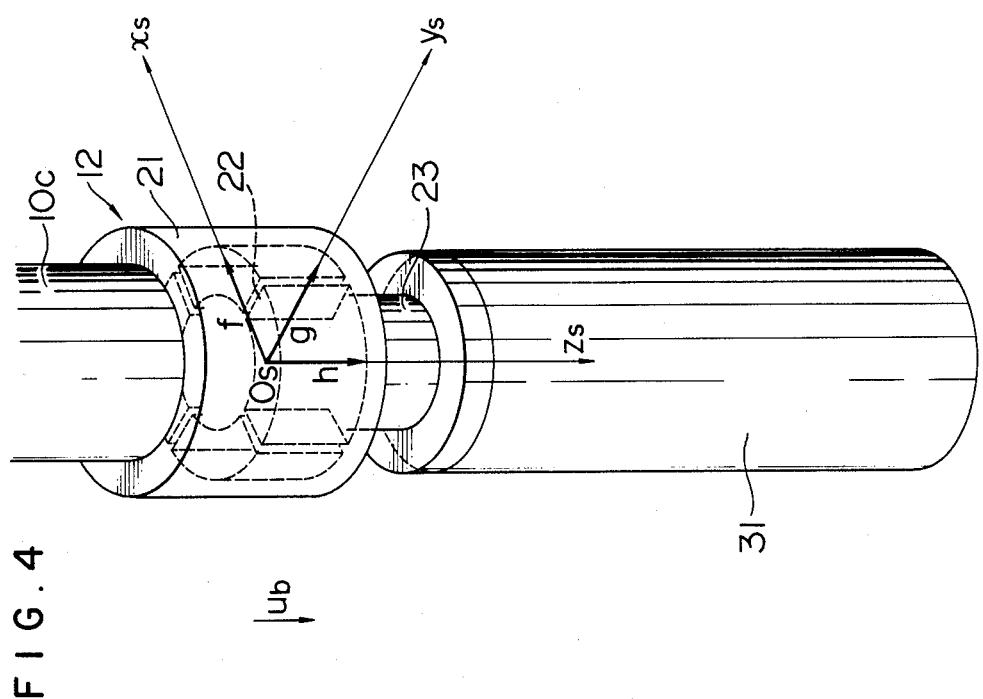
FIG. 4 is a diagram showing the case where a standard work is attached.

(3) Procedure to obtain the strain voltage $\bar{V}$ and force $\bar{F}$:

In place of the hand portion 13 shown in FIG. 2, a standard work is attached to the force sensor 12. FIG. 4 shows a perspective view in the case where a standard work is attached. It is assumed that a standard work 31 has the weight $W_{st}$ and the position of the center of gravity in the sensor coordinate system is $\bar{d}_{st}$. These $W_{st}$ and $\bar{d}_{st}$ can be together inputted from the control table 45 and are known values.

Since the standard work 31 of $W_{st}$ is added to the internal weight $W_{in}$, the total weight W of them becomes $$W = W_{in} + W_{st} \tag{8}$$

On the other hand, the position $\bar{d}$ of the center of gravity (S system indication) becomes $$\bar{d} = (W_{in} \cdot \bar{d}_{in} + W_{st} \cdot \bar{d}_{st})/(W_{in} + W_{st}) \tag{9}$$

As shown in FIG. 2, it is now assumed that the unit vector indicative of the direction of the gravity is $\bar{u}_b$ in the coordinate system $(O_b - x_b - y_b - z_b)$ of the base of the wrist 10c. This $\bar{u}_s$ is a known value which can be obtained on the basis of the position $\bar{\theta}$ which is detected from the encoder PE. The unit vector indicative of the direction of the center of gravity in the sensor coordinate system assumes $\bar{u}_s$. The unit vectors in the directions of the respective coordinate axes in the sensor coordinate system assume $\bar{f}$, $\bar{g}$ and $\bar{h}$. The following equation is satisfied under these conditions.

$$\bar{u}_s = [\bar{f}, \bar{g}, \bar{h}]^T \cdot \bar{u}_s \tag{10}$$

Assuming that the force and moment are together $\bar{F}$ in consideration of both of the internal weight of the force sensor and the weight of the standard work, $$\bar{F} = \begin{pmatrix} \bar{f} \\ \bar{m} \end{pmatrix} \tag{11}$$

Where, $\bar{f}$ is a translational force acting on the force sensor in the sensor coordinate system and $\bar{m}$ denotes a moment around the origin in the sensor coordinate system.

$$\bar{f} = W \cdot \bar{u}_s \tag{12}$$

$$\bar{m} = \bar{d} \times W \cdot \bar{u}_s = \bar{d} \times \bar{f} \tag{13}$$

Therefore, $\bar{F}$ is a six-dimensional vector.

Six elements of the vector $\bar{F}$ denote the components of the force in the x, y and z axes and the components of the moment in the x, y and z axes.

On one hand, the strain voltage $\bar{V}$ is obtained from equation (2). Namely, the actual strain voltage $\bar{V}_0$ is derived and the voltage $\bar{V}_d$ is subtracted from this $\bar{V}_0$, so that the value of $\bar{V}$ can be derived.

(4) Procedure to obtain the transformation matrix [B]:

The process mentioned in the above item (3) is one example of measurement under the condition whereby only one posture is set and one standard work is attached. In the actual situation, measurement is performed under the respective conditions whereby the posture of the robot is varied and the standard work is changed (the weight and the position of the center of gravity are changed) in response to commands from the control table 45.

By respectively executing the measurement under the conditions of (posture $a_1$, work $b_1$), (posture $a_2$, work $b_2$), ..., and (posture $a_m$, work $b_m$), the following equations are derived.

$$\left. \begin{array}{l} \bar{F}_1 = [B] \cdot \bar{V}_1 \\ \bar{F}_2 = [B] \cdot \bar{V}_2 \\ \vdots \\ \bar{F}_m = [B] \cdot \bar{V}_m \end{array} \right\} \tag{14}$$

Equation (14) can be combined as a matrix expression.

$$[\bar{F}_1, \bar{F}_2, \ldots, \bar{F}_m] = [B][\bar{V}_1, \bar{V}_2, \ldots, \bar{V}_m] \tag{15}$$

Where, $[\bar{F}_1, \bar{F}_2, \ldots, \bar{F}_m]$ is a matrix of six rows and m columns, $[B]$ is a matrix of six rows and n columns, and $[\bar{V}_1, \bar{V}_2, \ldots, \bar{V}_m]$ is a matrix of n rows and m columns, wherein $m \geq 6$ and $n \geq 6$. On one hand, it is assumed that at least six independent vectors are included in $\bar{F}_1, \bar{F}_2, \ldots, \bar{F}_m$. When $[\bar{F}_1, \bar{F}_2, \ldots, \bar{F}_m]$ is substituted by $[F]$ and $[\bar{V}_1, \bar{V}_2, \ldots, \bar{V}_m]$ is substituted by $[V]$, equation (15) will become $$[F] = [B][V] \tag{16}$$

Therefore, $$[B] = [F][V]^* \tag{17}$$

where, $$[V]^* = [V]^T [[V][V]^T]^{-1} \tag{18}$$

From equation (17), the transformation matrix [B] can be obtained.

[2]

(1) Example of modification:

The foregoing embodiment relates to a method by way of sets consisting of different postures and work (for example, six sets). However, there is also another method.

Figure 5:
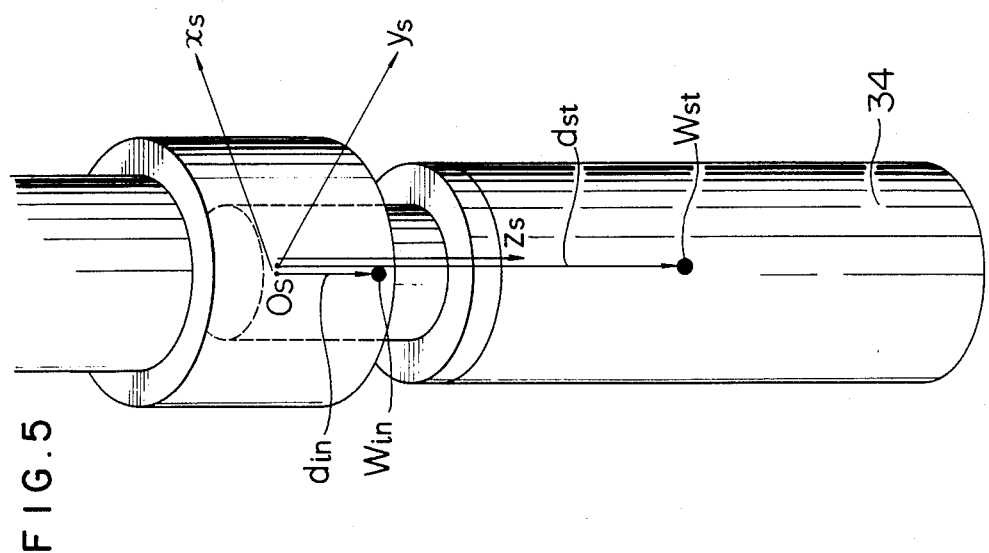
FIG. 5 is a diagram showing the case where another standard work is attached.
Figure 6:
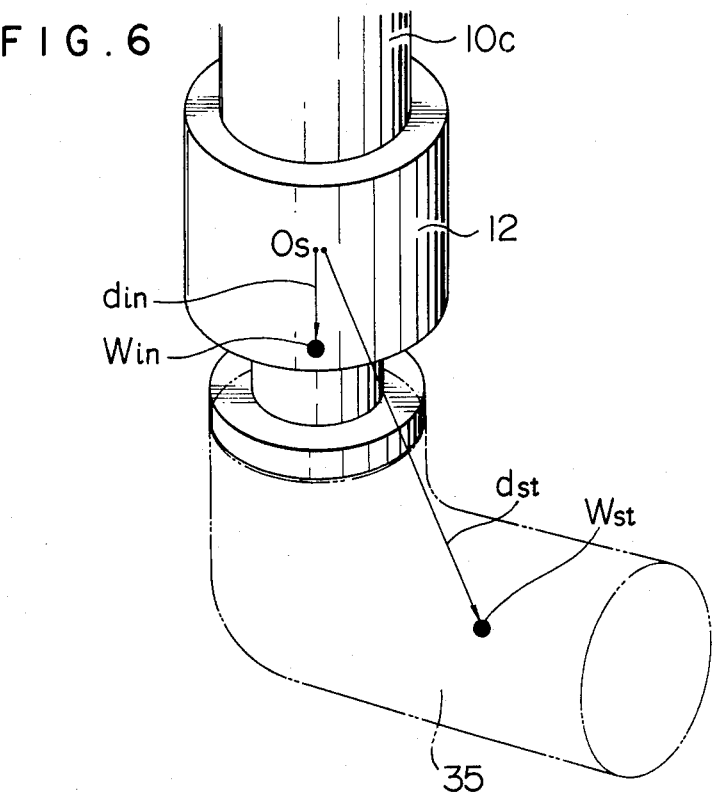
FIG. 6 is a diagram showing the case where still another work is attached.

Namely, it is a method whereby two kinds of works whose positions of the centers of gravity differ as shown in FIGS. 5 and 6, for instance, works 34 and 35 are used, and three or more kinds of different postures are set with respect to one work, thereby obtaining the forces $\bar{F}_1, \bar{F}_2, \ldots, \bar{F}_l$ (where, $1 \geq 6$) which are applied to the force sensor. As will be explained hereinafter, at least six independent forces are included in those forces $\bar{F}_1$ to $\bar{F}_l$. By substituting $\bar{F}_1$ to $\bar{F}_l$ for equation (15) and substituting the voltages $\bar{V}_1, \bar{V}_2, \ldots, \bar{V}_l$ of the corresponding strain gauges for $\bar{V}_1, \bar{V}_2, \ldots, \bar{V}_m$, the transformation matrix [B] can be derived from equation (17).

Figure 8:
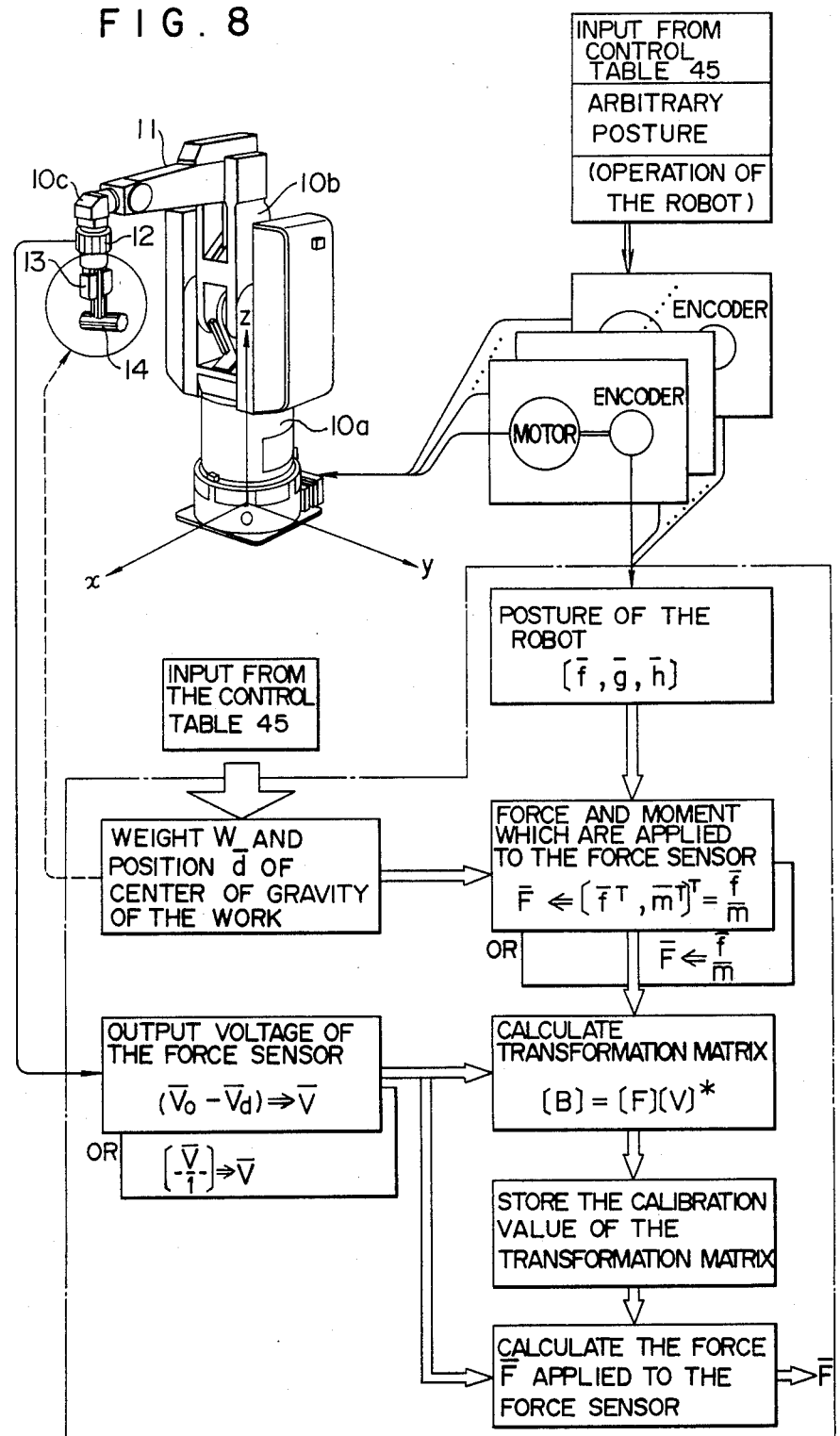
FIG. 8 is a flowchart showing a procedure for calculating the rigidity transformation matrix [B] of the force sensor of the present invention.

(2) Method of applying six independent forces:

In FIG. 8, the robot 10 is used to change the posture of the force sensor. By allowing the weight 14 in which the position of the center of gravity and the weight are known to depend from the hand portion 13 in which the position of the center of gravity and the weight are known, the force independent to the force sensor 12 is applied to the end of the force sensor 12 attached to the wrist 10c of the robot 10. The direction opposite to the direction of the gravity of the earth is the z axis and the coordinate axes of x and y are arbitrarily determined. Then, the postures of the force sensor 12 expressed by those fundamental coordinates are represented by the $\bar{f}$, $\bar{g}$ and $\bar{h}$ vectors. These $\bar{f}$, $\bar{g}$ and $\bar{h}$ are direction cosines in the case where the coordinate axes of the sensor system are considered in the fundamental coordinate system.

Figure 7:
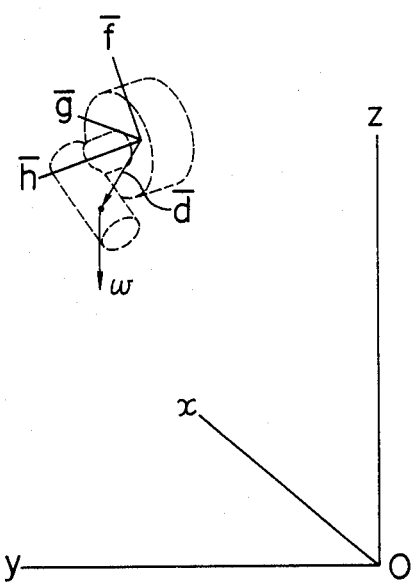
FIG. 7 is a diagram showing the posture of the force sensor and the like according to the present invention.

Now, assuming that the position vector of the weight 14 (including the hand portion 13) in the sensor system is $\bar{d}$ and the weight is W as shown in FIG. 7, the translational force $\bar{f}$ and moment $\bar{m}$ which act on the force sensor 12 due to the weight 14 are expressed by the following equations.

$$\bar{f} = (-Wf_z, -Wg_z, -Wh_z) \tag{19}$$

$$\bar{m} = \bar{d} \times \bar{f} \tag{20}$$

where, $$\bar{f} = (f_x, f_y, f_z) \tag{21}$$

$$\bar{g} = (g_x, g_y, g_z) \tag{22}$$

$$\bar{h} = (h_x, h_y, h_z) \tag{23}$$

It will be obviously appreciated from equation (10) or (19), or equation (11) or (20) that the values of $\bar{f}$ and $\bar{m}$ can be sufficiently varied by changing the posture of the force sensor due to a single work. However, only up to three sets of forces and moments which can be applied to the force sensor in this way are linear and independent. It is now assumed that the $\bar{q}$ vector is a six-dimensional vector consisting of the vector $\bar{f}$ of the translational force and the vector $\bar{m}$ of the moment. This vector denotes the column component vector $\bar{F}$ of the matrix [F].

$$\bar{q} = [\bar{f}^T, \bar{m}^T]^T \tag{24}$$

where, T denotes transposition.

No problem will be caused if six $\bar{q}$ vectors are independent; however, when the values of $\bar{d}$ and W are constant, only three sets of linear and independent forces are provided. An attention is first paid to the translational force which is a component of the vector $\bar{q}$. Unless $\bar{f}_1$ and $\bar{f}_2$ and $\bar{f}_3$ exist on the same plane, $\bar{f}_1$, $\bar{f}_2$ and $\bar{f}_3$ are obviously linear and independent and in this case, $\bar{q}_1$, $\bar{q}_2$ and $\bar{q}_3$ are also linear and independent. Another $\bar{q}_i$ is then be examined. This $\bar{q}_i$ is expressed as follows.

$$\bar{q}_i = [\bar{f}_i^T, \bar{m}_i^T]^T \quad (i \geq 4) \tag{25}$$

Since $\bar{f}_1$, $\bar{f}_2$ and $\bar{f}_3$ are linear and independent, $\bar{f}_i$ apparently becomes $$\bar{f}_i = a\bar{f}_1 + b\bar{f}_2 + c\bar{f}_3 \tag{26}$$

(where, a, b and c are arbitrary real numbers) Namely, $\bar{f}_i$ is expressed by the sum of $\bar{f}_1$, $\bar{f}_2$ and $\bar{f}_3$. Therefore, $\bar{f}_i$ becomes linear and dependent. Next, $\bar{m}_i$ is examined.

From equation (13) or (20), $$\bar{m}_i = \bar{d} \times \bar{f}_i \tag{27}$$

By substituting equation (26) for equation (21), we have $$\bar{m}_i = \bar{d} \times (a\bar{f}_1 + b\bar{f}_2 + c\bar{f}_3)$$

$$= a(\bar{d} \times \bar{f}_1) + b(\bar{d} \times \bar{f}_2) + c(\bar{d} \times \bar{f}_3)$$

$$= am_1 + bm_2 + cm_3 \tag{28}$$

From equations (26) and (28), $$\bar{q}_i = a\bar{q}_1 + b\bar{q}_2 + c\bar{q}_3 \tag{29}$$

Therefore, $\bar{q}_i$ is expressed by the sum of $\bar{q}_1 + \bar{q}_2 + \bar{q}_3$ and is linear and dependent. It will be understood from the above-mentioned point that only three sets of linear and independent forces are derived in the case where W and $\bar{d}$ are constant. It will be understood from equation (12) or (19) or equation (13) or (20) that even if W is changed, $\bar{q}_i$ is merely increased by constant times; therefore, to obtain other independent forces, it is necessary to vary the position vector $\bar{d}$ until the position of the center of gravity. Consequently, to apply four or more sets of linear independent forces, it is sufficient that the weight is replaced by another weight in which the position of the center of gravity differs. The foregoing points are summarized as follows. In the force sensor which can sense three or less kinds of forces, it is sufficient to apply up to three sets of independent forces; so that one weight is needed. While, in the force sensor which can sense four or more kinds of forces, it is necessary to apply four or more independent forces; therefore, two kinds of weights are needed.

[3]
(1) Another example of modification:

The foregoing modification relates to an example. The number of kinds of works, the number of works, the number of kinds of postures, and the number of postures may be arbitrarily selected if they satisfy the condition such that at least six independent forces $\bar{F}$ are included. Therefore, a proper combination may be selected in accordance with each requirement of the conditions when the transformation matrix [B] is selected, for example, (a) the change in kinds of works is made as little as possible;

(b) the work is set into the posture as near as the downward posture as possible;

(c) a degree of accuracy of the [B] is made as high as possible; and the like.

On the other hand, the $O_b' - x_b' - y_b' - z_b'$ coordinate system was defined for convenience of description of the posture; however, any other coordinate systems may be used as necessary.

[4]
(1) Method of obtaining the transformation matrix including the voltage $\bar{V}_d$:

As another feature of the present invention, there is a method whereby the transformation matrix [A] having the offset force and moment as one column component in the transformation matrix is used.

As shown in FIG. 8, if the data which is outputted from the force sensor when an arbitrary force $\bar{F}_i = (f_{xi}, f_{yi}, f_{zi}, m_{xi}, m_{yi}, m_{zi}, 1)$ was applied to the force sensor assumes $\bar{V}_i = (v_{1i}, v_{2i}, v_{3i}, v_{4i}, v_{5i}, v_{6i}, 1)$, the matrix [F] in which the vectors of the force are the column components and the matrix [V] in which the force sensor data are the column components are derived. Namely, $$[F] = (\bar{F}_1, \bar{F}_2, \ldots, \bar{F}_7, \ldots, \bar{F}_l) \tag{30}$$

$$[V] = (\bar{V}_1, \bar{V}_2, \ldots, \bar{V}_7, \ldots, \bar{V}_l) \tag{31}$$

where, $l \geq 7$. The following relational expression is obviously satisfied among those matrices [F] and [V] and the rigidity matrix [A].

$$[V] = [A][F] \tag{32}$$

Therefore, if the matrix [F] has an inverse matrix $[F]^{-1}$ or an affine inverse matrix $[F]^*$, the rigidity matrix [A] can be obtained. Namely, $$[A]=[V][F]^{-1} \quad (l=7) \tag{32}$$

$$[A]=[V][F]^* \quad (l>7) \tag{33}$$

In this case, the affine inverse matrix $[F]^*$ is considered to be least square approximation and approximation and is expressed by the following equation.

$$[F]^*=[F]^T[[F][F]^T]^{-1} \tag{33}$$

The necessary and sufficient condition in the case where the matrix [F] has the inverse matrix $[F]^{-1}$ or affine inverse matrix $[F]^*$ is that the column components $\overline{F}_i$ of the matrix [F] are linear and independent. In other words, in the force sensor which can sense n kinds of forces ($1 \leq n \leq 6$), it will be appreciated that n or more column components $\overline{F}_i$ have to be linear and independent. Thus, in this embodiment, since n equals 6, it is necessary to apply the column vectors of at least six linear independent forces to the force sensor. However, since the extended rigidity matrix [A] including the bias value is $7 \times 7$, one or more column vectors of the linear independent force are further needed. The foregoing points can be summarized as follows. In the force sensor which can sense n kinds of forces ($1 \leq n \leq 6$), it is necessary to apply at least n sets of linear independent forces to the force sensor and in order to obtain the rigidity matrix [A] including the bias value, it is the necessary and sufficient condition to apply $(n+1)$ or more sets of forces to the force sensor.

Namely, this embodiment intends to obtain the transformation matrix [A] of which the transformation matrix [B] shown in FIG. 10 was extended to seven rows and $(n+1)$ columns from six rows and n columns. FIG. 11 shows one example of such an extended transformation matrix [A].

As mentioned previously, the strain voltage $\overline{V}$ is derived by subtracting the offset voltage $\overline{V}_d$ previously obtained from the voltage $\overline{V}_0$ as shown in equation (2) and this data is used as the data of the matrix [V] of the voltage. However, by obtaining the matrix [A], which is another feature of the present invention, there is no need to preliminarily obtain the offset voltage $\overline{V}_d$. For example, the matrix [A] can be obtained by the following method. Namely, the column components $\overline{F}_i$ of the matrix [F] of equation (15) assume $$\overline{F}_i' = \begin{pmatrix} \overline{F}_i \\ 1 \end{pmatrix} \tag{34}$$

and the column components $\overline{V}_i$ of the matrix [V] assume $$\overline{V}_i' = \begin{pmatrix} \overline{V}_i \\ 1 \end{pmatrix}$$

In this case, at least seven independent components $\overline{F}_i'$ may be included.

As described above, if the total number of measurement times is seven or more with regard to the force sensor 12 having a six-dimensional vector, the rigidity transformation matrix [B] in consideration of the bias value can be extremely simply and promptly calculated in the state whereby the force sensor 12 is attached to the wrist 10c of the robot without removing the hand portion 13.

In any cases, the robot 10 is provided with the control unit 40 and the like as mentioned above. Further, the driving motors M and encoders PE are attached to the robot 10 and the position and posture of the force sensor 12 of the robot can be detected from the encoders PE. Moreover, the force sensor 12 of the robot can be set into an arbitrary position and posture by inputting a command to the control unit 40 from the control table 45. Also, it is possible to input the known data (for example, the weights of the force sensor 12, hand portion 13, and weights 31, 34, 35, and 14, and the positions of the centers of gravity of the force sensor 12, hand portion 13, and weights 31, 34, 35, and 14) from the control table 45. In addition, the foregoing arithmetic logic equations are stored in the arithmetic logic unit 44 of the control unit 40. Therefore, the microprocessor 41 reads out the program stored in the ROM 43 and sets the robot into various postures in response to commands from the control table 45. At the same time, the weight is changed and the weights and the positions of the centers of gravity of the weights and the like are given from the control table 45. Predetermined arithmetic logic operations are performed in the ALU 44 on the basis of the voltage value $\overline{V}$ detected from the force sensor 12 under the respective conditions, thereby calibrating the rigidity transformation matrix [B] of the force sensor. Then, this calibrated matrix is stored into the RAM 42. FIG. 8 shows the processing procedure for such calibration. After that, the microprocessor 41 reads out the rigidity transformation matrix [B] stored in the RAM 42 and executes the arithmetic operating process such that the matrix [B] is multiplied to the voltage value $\overline{V}$ detected from the force sensor 12 and the like. In this manner, the force $\overline{F}$ actually applied to the force sensor 12 can be calculated. For instance, as shown in U.S. patent application Ser. No. 621717 and EPC application No. 84107013.9, it is possible to make the robot perform a predetermined work on the basis of the signal detected from the force sensor 12.

As described above, according to the present invention, the rigidity transformation matrix [B] can be derived due to the arithmetic logic operation by the robot itself equipped with the control unit without using a dedicated tool or the like, so that the invention presents the action and effect such that the calculation time and labor can be reduced. Namely, the work such that the force sensor is detached from the robot or the like can be eliminated.

Further, according to the present invention, since the force and moment are measured in the state whereby the bias value of the force sensor is always taken into account, the presence or absence of the variation in the bias value can be soon detected. At the same time, even if an external force enough to vary the bias value acts, they can be again measured without detaching the work and the like from the force sensor, so that a high degree of accuracy is derived and the measurement time can be reduced. Moreover, the transformation matrix of the force sensor which can cope with all of the forces and moments can be obtained. Also, efficient measurement can be performed by properly selecting the weight responsive to the kind of force sensor.

We claim:

1. A method of calibrating a transformation matrix of a force sensor, comprising the steps of:
   attaching a force sensor responsive to n-dimensions ($n \geq 3$) between a wrist portion and a hand portion constituting at least two operating elements of a robot;
   using said hand portion to hold a standard work whose mass and center of gravity are known;
   making respective operating elements and respective driving sources of said robot operative for driving said wrist portion in response to commands from a control unit and thereby sequentially changing the posture of said force sensor attached to the robot to apply to said force sensor n or more sets of linear independent forces and another force;
   obtaining a composite force consisting of a force component and a moment component through an arithmetic operation performed by the control unit on the basis of posture and position information about the force sensor derived from signals provided by encoders detecting operational values for each operating element of the robot and from the mass and the centers of gravity of said standard work and said hand portion;
   receiving at said control unit a strain voltage detected by said force sensor;
   using said control unit to calculate a transformation matrix including an offset value, for the force sensor from said composite force obtained and from the strain voltage received, in accordance with a predetermined arithmetic logic equation and then storing said transformation matrix into memory means; and
   calibrating the transformation matrix of the force sensor.

2. A calibrating method according to claim 1, wherein the number n is set to be not less than six, and a plurality of said standard works having different and known masses and centers of gravity are held by said hand portion.

* * * * *